(12) United States Patent
Reddy (10) Patent No.: US 8,547,711 B2
(45) Date of Patent: Oct. 1, 2013

(54) LLC CONVERTER ACTIVE SNUBBER CIRCUIT AND METHOD OF OPERATION THEREOF

(75) Inventor: Raghothama Reddy, Murphy, TX (US)

(73) Assignee: General Electric Company, Schenectady, NY (US)

( * ) Notice: Subject to any disclaimer, the term of this patent is extended or adjusted under 35 U.S.C. 154(b) by 434 days.

(21) Appl. No.: 12/950,545

(22) Filed: Nov. 19, 2010

(65) Prior Publication Data

US 2012/0127762 A1    May 24, 2012

(51) Int. Cl.
*H02M 3/335*    (2006.01)
*H02H 7/122*    (2006.01)

(52) U.S. Cl.
USPC ..................... 363/21.02; 363/56.01

(58) Field of Classification Search
USPC ................ 363/16, 17, 21.02, 56.01, 56.02, 363/97, 98, 131, 132
See application file for complete search history.

(56) References Cited

U.S. PATENT DOCUMENTS

| | | | | |
|---|---|---|---|---|
| 5,278,748 | A * | 1/1994 | Kitajima | 363/21.02 |
| 6,483,723 | B2 * | 11/2002 | Kuranuki et al. | 363/17 |
| 2011/0280048 | A1 * | 11/2011 | Fujiyoshi et al. | 363/21.04 |

* cited by examiner

*Primary Examiner* — Matthew Nguyen
(74) *Attorney, Agent, or Firm* — Dolly Wu; General Electric Company (57) ABSTRACT

An active snubber circuit for a power converter, a method of operating the same and an inductor inductor capacitor converter incorporating the circuit or the method. In one embodiment, the circuit includes: (1) a series-coupled first capacitor and diode associated with a secondary-side switch in the power converter and coupled to an output thereof and (2) an active snubber circuit switch coupled in parallel with the diode and configured to receive a control signal that closes the active snubber circuit switch during at least a portion of a time during which the secondary-side switch is open.

20 Claims, 6 Drawing Sheets

LLC CONVERTER ACTIVE SNUBBER CIRCUIT AND METHOD OF OPERATION THEREOF

TECHNICAL FIELD

This application is directed, in general, to power converters and, more specifically, to an LLC converter active snubber circuit and method of operation thereof.

BACKGROUND

A power converter is a power processing circuit that converts an input voltage waveform into a specified output voltage waveform. In many applications requiring a DC output, switched-mode DC/DC power converters are frequently employed to advantage. The switched-mode DC/DC power converters generally include an inverter, an isolation transformer and a rectifier on a secondary side of the isolation transformer. The inverter generally includes a main power switch, such as a field effect transistor ("FET"), that converts the DC input voltage to an AC voltage. The isolation transformer, then, transforms the AC voltage to another value and the rectifier generates the desired DC voltage at the output of the power converter. Conventionally, the rectifier includes a plurality of rectifier switches (e.g., diodes, or FETs acting as synchronous rectifier switches) that conduct the load current in response to the input waveform thereto.

The main power switch and rectifier switches are usually operated at relatively high switching frequencies such as 200-300 kHz to allow the use of smaller components such as inductors and capacitors within the power converter. As a result, parasitic or stray inductance or capacitance associated with the components of the power converter can be reduced.

The residual parasitic elements mentioned above, however, may generate high frequency oscillations that appear as undesired "ringing" waveforms in the power converter associated with the switching transitions, particularly, those associated with the transformer and switches. The ringing waveforms, which are superimposed on the waveforms associated with the normal operation of the power converter, prompt the use of higher rated and higher cost circuit components to operate in such an environment. Additionally, the deleterious ringing waveforms cause the power converter to be more lossy and less efficient. Some of the loss manifests itself as undesirable electromagnetic interference (EMI) causing regulatory problems which must be addressed. Due to the relatively small resistance values inherent in the transformer and inductor elements, the ringing energy may only be lightly damped in the power converter.

Synchronous power converters are an ever-increasingly important part of power conversion strategies and systems. One type of power converter that has been of increasing interest is the "inductor inductor capacitor" converter ("LLC converter"). For example, see Yang, "Topology Investigation for Front End DC/DC Power Conversion for Distributed Power System," Virginia Polytechnic Institute and State University, 2003, incorporated herein by reference in its entirety.

SUMMARY

One aspect provides an active snubber circuit for a power converter. In one embodiment, the circuit includes: (1) a series-coupled first capacitor and diode associated with a secondary-side switch in the power converter and coupled to an output thereof and (2) an active snubber circuit switch coupled in parallel with the diode and configured to receive a control signal that closes the active snubber circuit switch during at least a portion of a time during which the secondary-side switch is open.

Another aspect provides a method of operating an LLC converter. In one embodiment, the method includes: (1) configuring one or more primary-side switches, (2) configuring one or more secondary-side switches and (3) configuring one or more active snubber circuit switches thereby to cause energy to be directed to an output of the LLC converter.

Yet another aspect provides an LLC converter. In one embodiment, the LLC converter includes: (1) an isolation transformer having a primary winding and first and second secondary windings, (2) a resonant inductor and resonant capacitor coupled in series with the primary winding, the primary winding being further coupled to a negative rail of an input of the converter, (3) a first primary-side switch coupled between the resonant inductor and a positive rail of the input, (4) first and second secondary-side switches coupled to an output capacitor via first and second secondary windings, an output of the converter derived from across the output capacitor and (5) an active snubber circuit associated with each of the first and second secondary-side switches, each of the active snubber circuits including: (5a) a series-coupled first capacitor and diode associated with a corresponding one of the first and second secondary-side switches and coupled to the output and (5b) an active snubber circuit switch coupled in parallel with the diode and configured to receive a control signal that closes the active snubber circuit switch during at least a portion of a time during which the corresponding one of the first and second secondary-side switches is open.

BRIEF DESCRIPTION

Reference is now made to the following descriptions taken in conjunction with the accompanying drawings, in which.

DETAILED DESCRIPTION

As stated above, residual parasitic elements in power converters may generate high frequency oscillations that appear as undesired ringing waveforms during switching transitions. What is generally needed in the art is a snubber circuit capable of reducing the undesirable ringing waveforms occurring in the rectifier during switching transitions thereof without significantly reducing the converter's efficiency. Such a snubber circuit may allow lower-rated components to be employed in the converter or increase the reliability of the components employed therein. Previous snubber circuits for an LLC converter are typically made of passive components (e.g., resistors, capacitors and diodes) that dissipate the ringing energy predominantly as heat. What is further needed in the art is an active snubber circuit that transfers the energy that would otherwise cause ringing to the output of a converter, thus employing that energy to increase the converter's efficiency. Introduced herein are various embodiments of an active snubber circuit and method of operating the same that employs at least one active component (e.g., a switch) to reroute the energy that would otherwise cause ringing or be substantially dissipated in passive components to the output of a converter. The energy is thereby employed to increase the converter's efficiency. In some embodiments, the converter is an LLC converter. In some of those embodiments, the LLC converter is operating in a variable frequency mode, and in other of those embodiments, the LLC converter is operating in a pulse-width modulated (PWM) mode.

Figure 1:
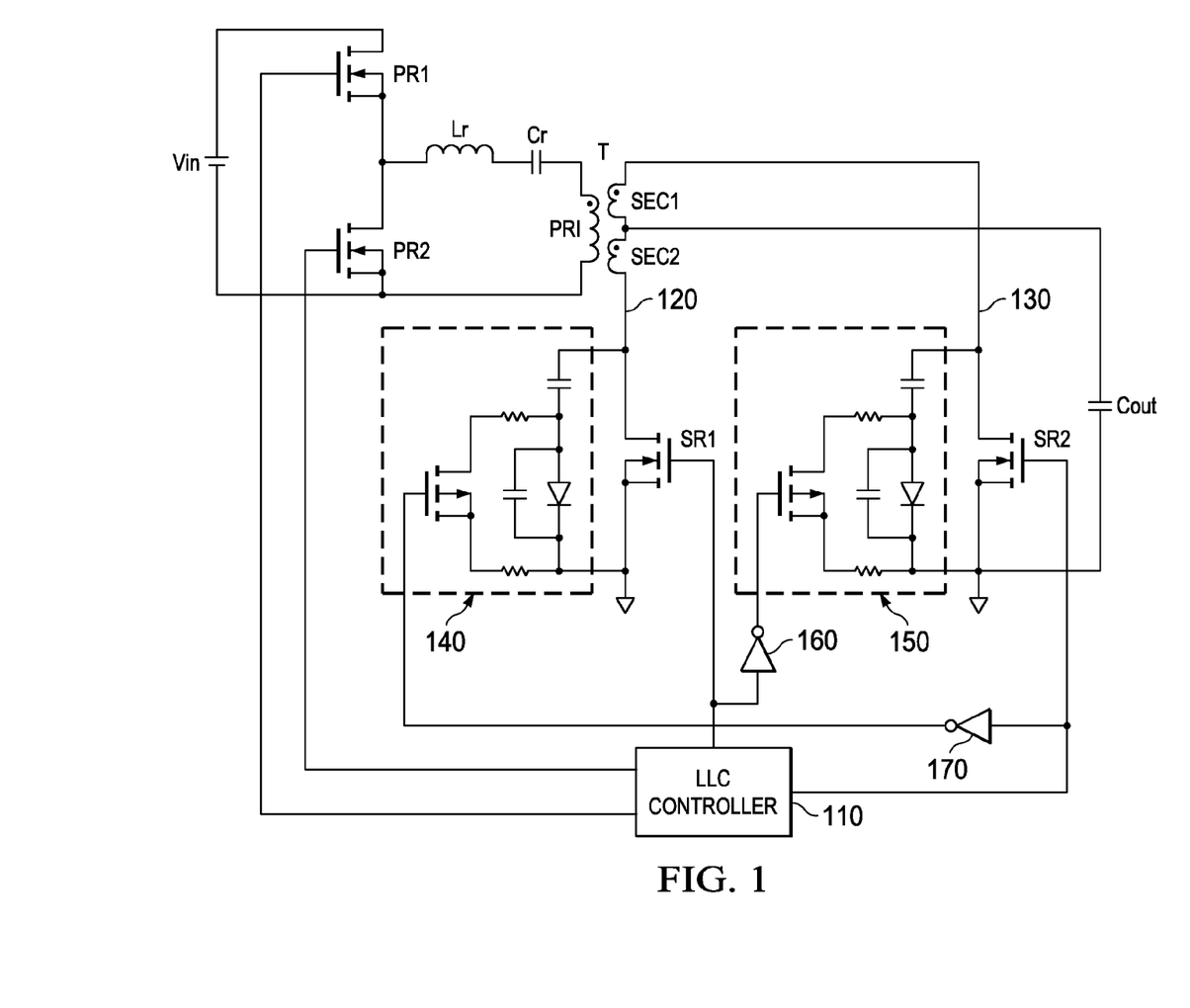
FIG. 1 is a diagram of one embodiment of an LLC converter constructed according to the principles of the invention.

Referring initially to FIG. 1, illustrated is a diagram of one embodiment of an LLC converter constructed according to the principles of the invention. The converter includes an isolation transformer T having a primary winding PRI and first and second secondary windings SEC1, SEC2 having relative polarities as shown in FIG. 1. A resonant inductor Lr and resonant capacitor Cr are coupled in series with the primary winding PRI, which is also coupled to a negative rail of a converter input Vin. First and second primary-side switches PR1, PR2 respectively and alternately couple the resonant inductor Lr to a positive rail of the converter input Vin and the negative rail thereof. The first and second secondary windings SEC1, SEC2 are respectively coupled between first and second secondary-side switches SR1, SR2 and an output capacitor Cout. The first and second secondary-side switches SR1, SR2 may be regarded as rectifier switches. Though FIG. 1 does not show it, positive and negative output rails of a converter output Vout may be derived from across the output capacitor Cout. In the embodiment of FIG. 1, the negative rail is illustrated as being a nominal ground of the converter. An LLC controller 110 provides control signals to the first and second primary-side switches PR1, PR2 and the first and second secondary-side switches SR1, SR2 to close and open them as needed to transfer power from the converter input Vin to the converter output Vout.

In one embodiment, in a first portion of the converter's operating cycle, the LLC controller 110 closes the first primary-side switch PR1 and opens the second primary-side switch PR2, increasing the voltage across the resonant inductor Lr, the resonant capacitor Cr, the primary winding PRI and the first and second secondary windings SEC1, SEC2. At the same time the LLC controller 110 closes the first primary-side switch PR1 and opens the second primary-side switch PR2, the LLC controller 110 also closes the first secondary-side switch SR1 and opens the second secondary-side switch SR2, increasing the voltage across the output capacitor Cout and delivering power to the converter output. Then, in a second portion of the converter's operating cycle, the LLC controller 110 opens the first primary-side switch PR1 and closes the second primary-side switch PR2, decreasing the voltage across the resonant inductor Lr, the resonant capacitor Cr, the primary winding PRI and the first and second secondary windings SEC1, SEC2. At the same time the LLC controller 110 opens the first primary-side switch PR1 and closes the second primary-side switch PR2, the LLC controller 110 also opens the first secondary-side switch SR1 and closes the second secondary-side switch SR2, again increasing the voltage across the output capacitor Cout and delivering power to the converter output. The LLC controller 110 then repeats the converter's operating cycle to maintain the converter's operation.

In an alternative embodiment, the LLC controller 110 slightly delays the control signals provided to the first and second secondary-side switches SR1, SR2 rather than switching them at the same time as switching the first and second primary-side switches PR1, PR2.

Over the operating cycle of the converter, the voltage across the output capacitor Cout is maintained at or near a desired level. In one embodiment, the LLC controller 110 monitors this voltage and adjusts the timing of the control signals provided to the first and second primary-side and secondary-side switches PR1, PR2, SR1, SR2 accordingly.

FIG. 1 shows a first node 120 that lies between the second secondary winding SEC2 and the first secondary-side switch SR1. FIG. 1 also shows a second node 130 that lies between the first secondary winding SEC1 and the second secondary-side switch SR2. As stated above, residual parasitic elements may generate ringing waveforms in the power converter associated with the switching transitions, particularly those associated with the transformer and switches. In the embodiment of FIG. 1, these ringing waveforms exist at the first node 120 when the first secondary-side switch SR1 is open and at the second node 130 when the second secondary-side switch SR2 is open. The ringing waveforms generally elevate the voltage at the first and second nodes 120, 130. Parasitic capacitances in the first and second secondary switches SR1, SR2 are typically such that the voltage is not able to dissipate quickly and therefore remains at the first and second nodes 120, 130. Conventional LLC converters have employed passive snubber circuits to damp these ringing waveforms, but those passive snubber circuits dissipate the energy in the ringing waveforms.

In contrast to the conventional LLC converters, the embodiment of FIG. 1 introduces an active snubber circuit configured to redirect at least part of the energy in the ringing waveforms to the output of the converter. The embodiment of FIG. 1 includes two active snubber circuits: a first active snubber circuit 140 and a second active snubber circuit 150. The first active snubber circuit 140 is coupled between the first node 120 and the negative rail (nominal ground) of the converter output Cout. The second active snubber circuit 150 is coupled between the second node 130 and the negative rail (nominal ground) of the converter output Cout. Because the LLC converter of FIG. 1 is operating in variable frequency mode, control signals for the first and second active snubber circuits 140, 150 can be a direct function of the control signals employed to open and close the first and second secondary-side switches SR1, SR2. In the embodiment of FIG. 1, the control signal for the first active snubber circuit 140 is an inverted form of the control signal employed to drive the second secondary-side switch SR2, and the control signal for the second active snubber circuit 150 is an inverted form of the control signal employed to drive the first secondary-side switch SR1. First and second inverters 160, 170 are configured to invert their respective control signals to provide these inverted control signals.

Figure 2:
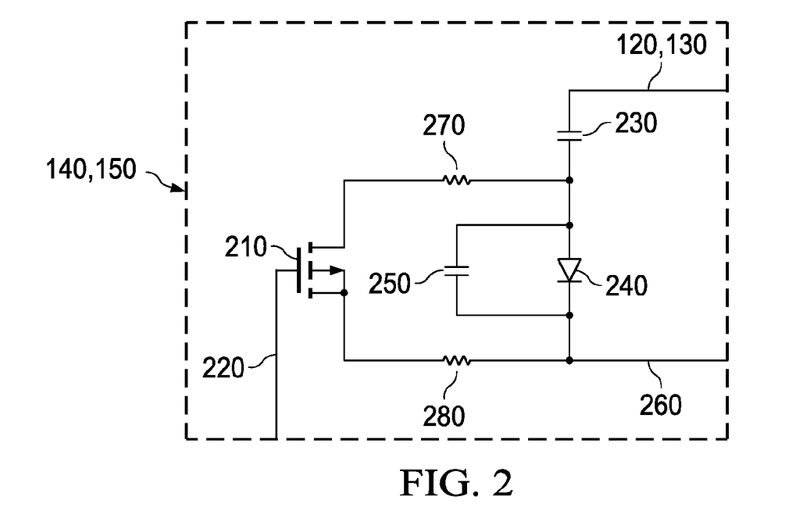
FIG. 2 is a diagram of one embodiment of an active snubber circuit constructed according to the principles of the invention.

Turning now to FIG. 2, illustrated is a diagram of one embodiment of an active snubber circuit constructed according to the principles of the invention. The embodiment of FIG. 2 includes a snubber active snubber circuit switch 210 configured to receive a control signal along a conductor 220 that terminates in a control terminal thereof. In the illustrated embodiment, the snubber active snubber circuit switch 210 is configured to control the recovery of snubber circuit energy to the output of the converter. In the illustrated embodiment, the active snubber circuit switch 210 is a P-channel field-effect transistor (FET). A first capacitor 230 is coupled to either the first or second node 120, 130 of FIG. 1, depending upon whether the active snubber circuit of FIG. 2 is acting as the first or second active snubber circuit 140, 150 of FIG. 1. A parallel-coupled diode 240 and second capacitor 250 are coupled in series between the first capacitor 230 and a nominal ground 260, which is ultimately becomes the negative rail of the converter output Cout as FIG. 1 shows. The first capacitor 230 and the diode 240 are configured to harvest the leakage energy in the transformer T and the secondary-side switches SR1, SR2 when the other secondary-side switch SR2, SR1 is turned off. First and second resistors 270, 280 couple the power terminals of the active snubber circuit switch 210 to either end of the parallel-coupled diode 240 and second capacitor 250. The first and second resistors 270, 280 are configured to limit current through the active snubber circuit switch 210, the second resistor 280 more particularly functioning as a source follower. An alternative embodiment employs only the first resistor 270 and omits the second resistor 280. A further alternative embodiment employs only the second resistor 280 and omits the first resistor 270. The capacitor 250 is configured to overcome the forward recovery-time of the diode 240. An alternative embodiment employs a plurality of parallel-connected diodes to increase the parasitic capacitance such that a discrete capacitor (e.g., the capacitor 25) may be eliminated.

Returning to FIG. 1, and with continuing reference to FIG. 2, one instance of the active snubber circuit of FIG. 2 is in place as the first active snubber circuit 140, and another instance of the active snubber circuit of FIG. 2 is in place as the second active snubber circuit 150. Continuing the discussion above regarding the converter's operating cycle, in the first portion of the converter's operating cycle, the LLC controller 110 opens the second primary-side switch PR2, second secondary-side switch SR2 and active snubber switch 210 of the first active snubber circuit 140. LLC controller 110 closes the first primary-side switch PR1, first secondary-side switch SR1 and active snubber switch 210 of the second active snubber circuit 150, this causes an increase in the voltage across the resonant inductor Lr, the resonant capacitor Cr, the primary winding PRI and the first and second secondary windings SEC1, SEC2 and output capacitor Cout. Consequently, not only does the voltage across the output capacitor Cout increase by virtue of the closing of the first secondary-side switch SR1, but at least some of the energy that would otherwise cause a ringing waveform in the second node 130 is instead routed through the second active snubber circuit 150 to the output of the converter, further raising the voltage across the output capacitor Cout delivering further power to the converter output.

Then, in a second portion of the converter's operating cycle, the LLC controller 110 opens the first primary-side switch PR1, first secondary-side switch SR1 and the active snubber switch 210 of the second active snubber circuit 150. The LLC controller 110 closes the second primary-side switch PR2, second secondary-side switch SR2 and active snubber switch 210 of the first active snubber circuit 140, this causes an increase in the voltage across the resonant inductor Lr, the resonant capacitor Cr, the primary winding PRI and the first and second secondary windings SEC1, SEC2 and output capacitor Cout. Consequently, not only does the voltage across the output capacitor Cout increase by virtue of the closing of the first secondary-side switch SR1, but at least some of the energy that would otherwise cause a ringing waveform in the second node 120 is instead routed through the second active snubber circuit 140 to the output of the converter, further raising the voltage across the output capacitor Cout delivering further power to the converter output The LLC controller 110 then repeats the converter's operating cycle to maintain the converter's operation.

Figure 3:
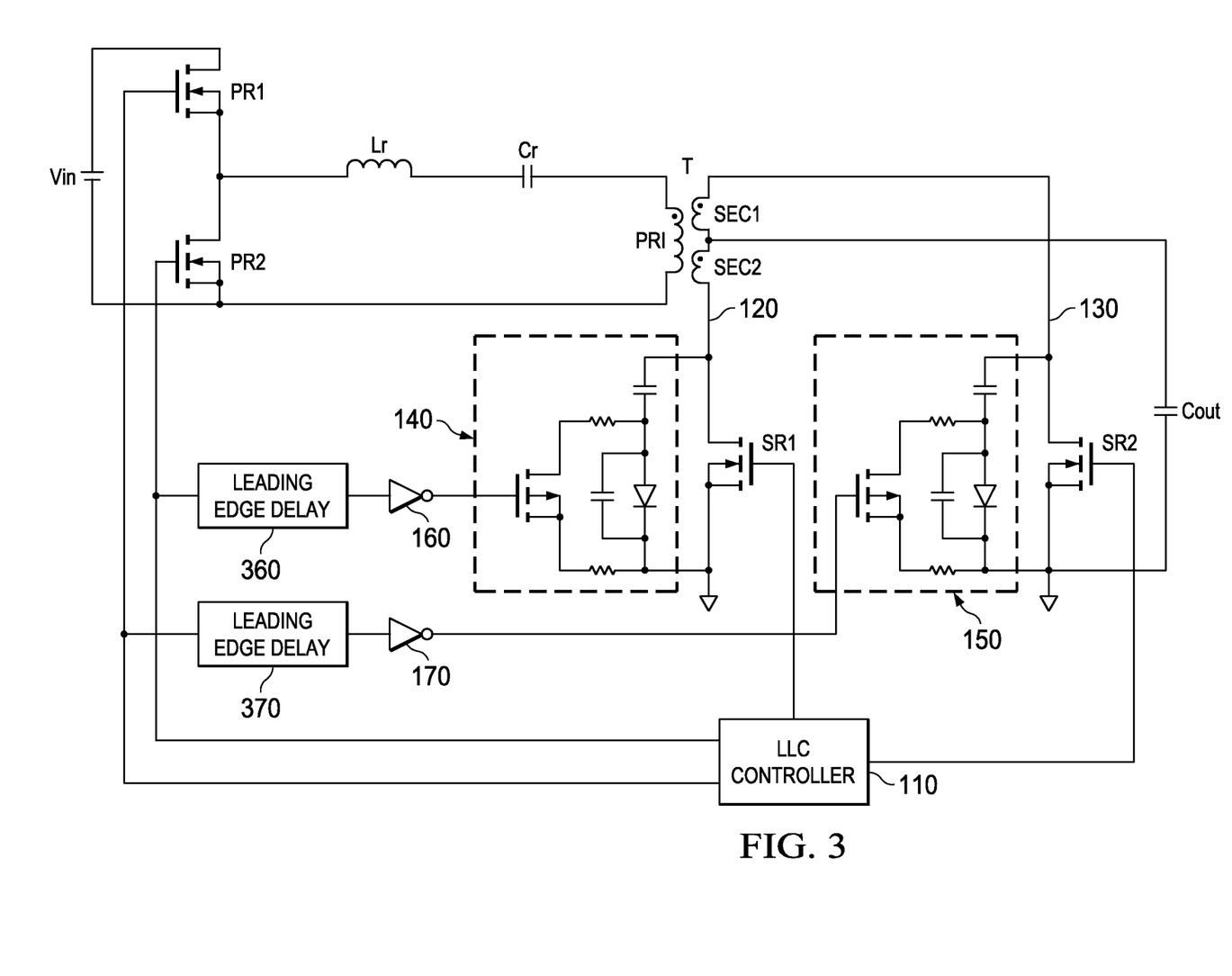
FIG. 3 is a diagram of another embodiment of an LLC converter constructed according to the principles of the invention.

Turning now to FIG. 3, illustrated is a diagram of another embodiment of an LLC converter constructed according to the principles of the invention. As described previously, an LLC converter is capable of operating in a PWM mode of operation. In such mode, it is inappropriate to derive the control signals for the first and second active snubber circuits 140, 150 from those employed to drive the first and second secondary-side switches SR1, SR2. Accordingly, FIG. 3 derives the control signals for the first and second active snubber circuits 140, 150 from those employed to drive the first and second primary-side switches PR1, PR2. Leading-edge delay circuits 360, 370 may be employed to delay the leading edge of the control signals slightly to account for delays in the switching of the first and second primary-side switches PR1, PR2 and the charging and discharging of the resonant inductor Lr, the resonant capacitor Cr, and the various windings PRI, SEC1, SEC2 of the isolation transformer T.

The active snubber circuit may also be employed in a power converter having a different topology than the LLC converter. In such embodiment, the active snubber circuit would have substantially the same structure and function and would straddle one or more secondary-side switches to redirect energy that may otherwise result in ringing waveforms proximate the switches. In such non-LLC power converter, the control waveform(s) employed to drive the active snubber circuit(s) would typically be derived from those employed to drive one or more primary-side switches, perhaps with some leading-edge delay as shown in FIG. 3.

Figure 4A:
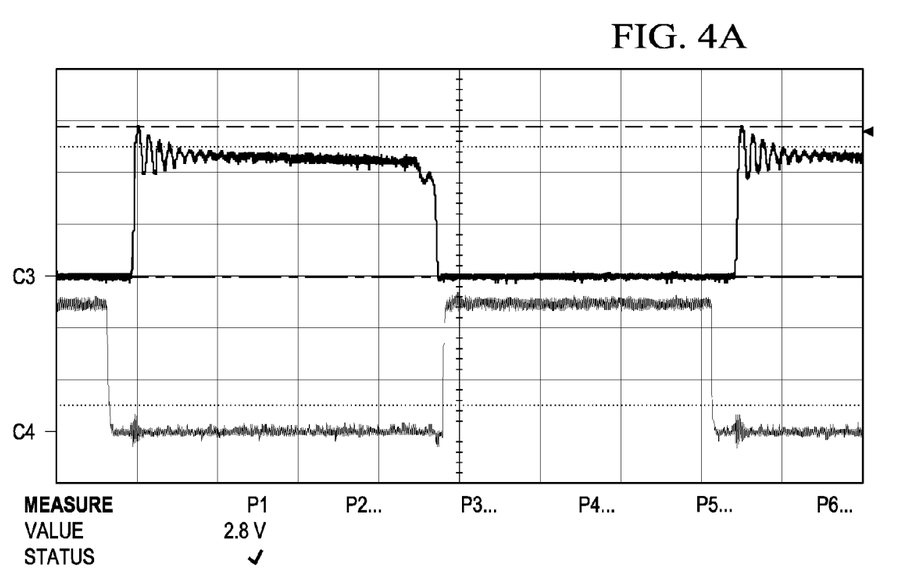
FIGS. 4A-4D are waveforms illustrating the operation of an embodiment of an LLC converter containing an active snubber circuit.
Figure 4B:
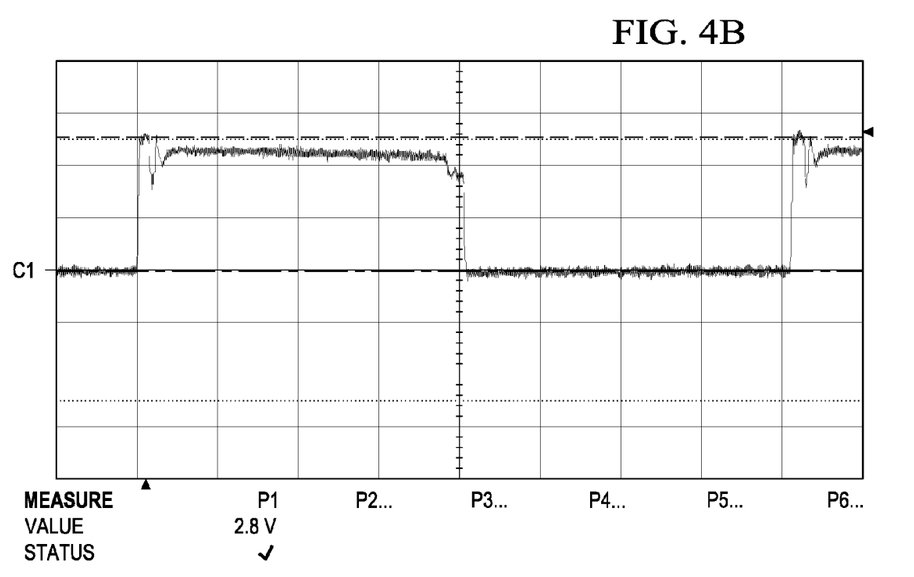
Figure 4C:
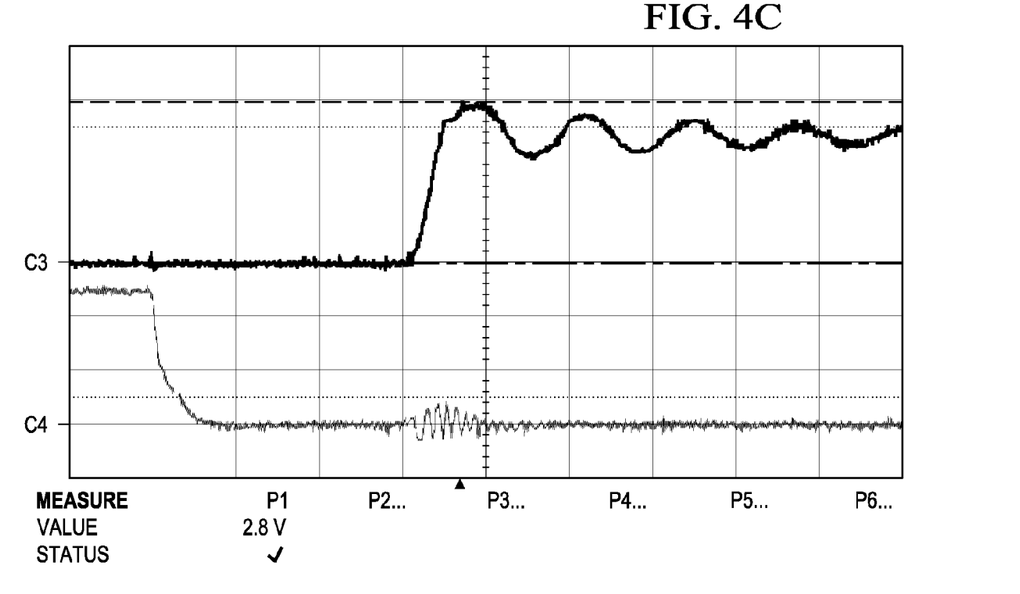
Figure 4D:
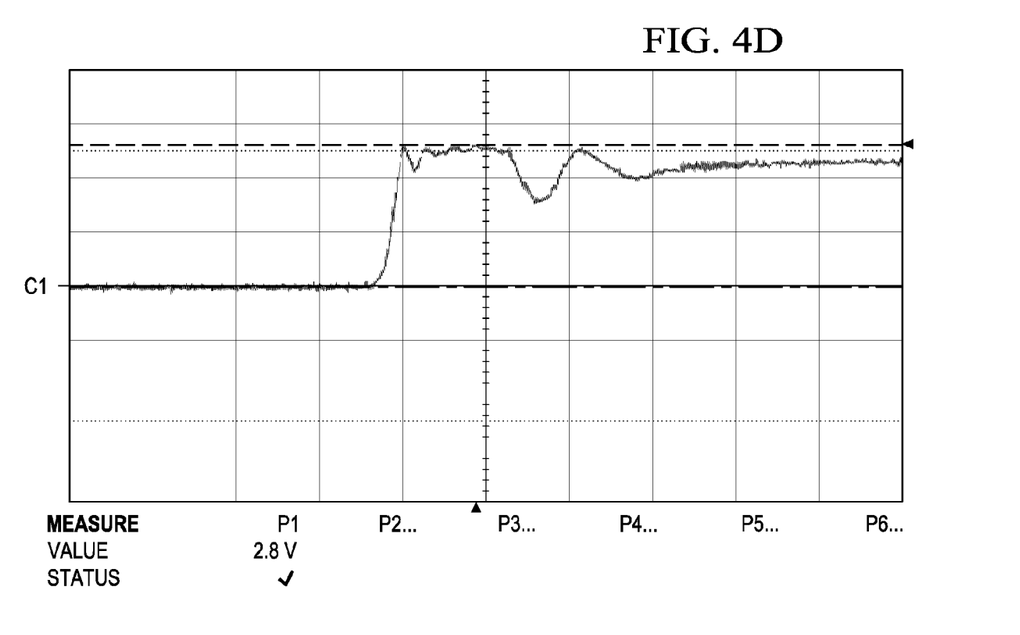

Turning now to FIGS. 4A-4D, illustrated are waveforms illustrating the operation of an embodiment of an LLC converter containing an active snubber circuit. FIG. 4A illustrates node voltage (e.g., the voltage at the first node 120) as a function of time in the absence of an active snubber circuit constructed according to the principles of the invention. FIG. 4B illustrates node voltage (e.g., the voltage at the first node 120) as a function of time in the presence of an active snubber circuit constructed according to the principles of the invention. FIG. 4C conveys the same information as FIG. 4A with an expanded time scale, and FIG. 4D conveys the same information as FIG. 4B with an expanded time scale. It is apparent from a comparison of FIGS. 4A-4D that the presence of the active snubber circuit has reduced the ringing waveform both in terms of amplitude and duration.

Figure 5:
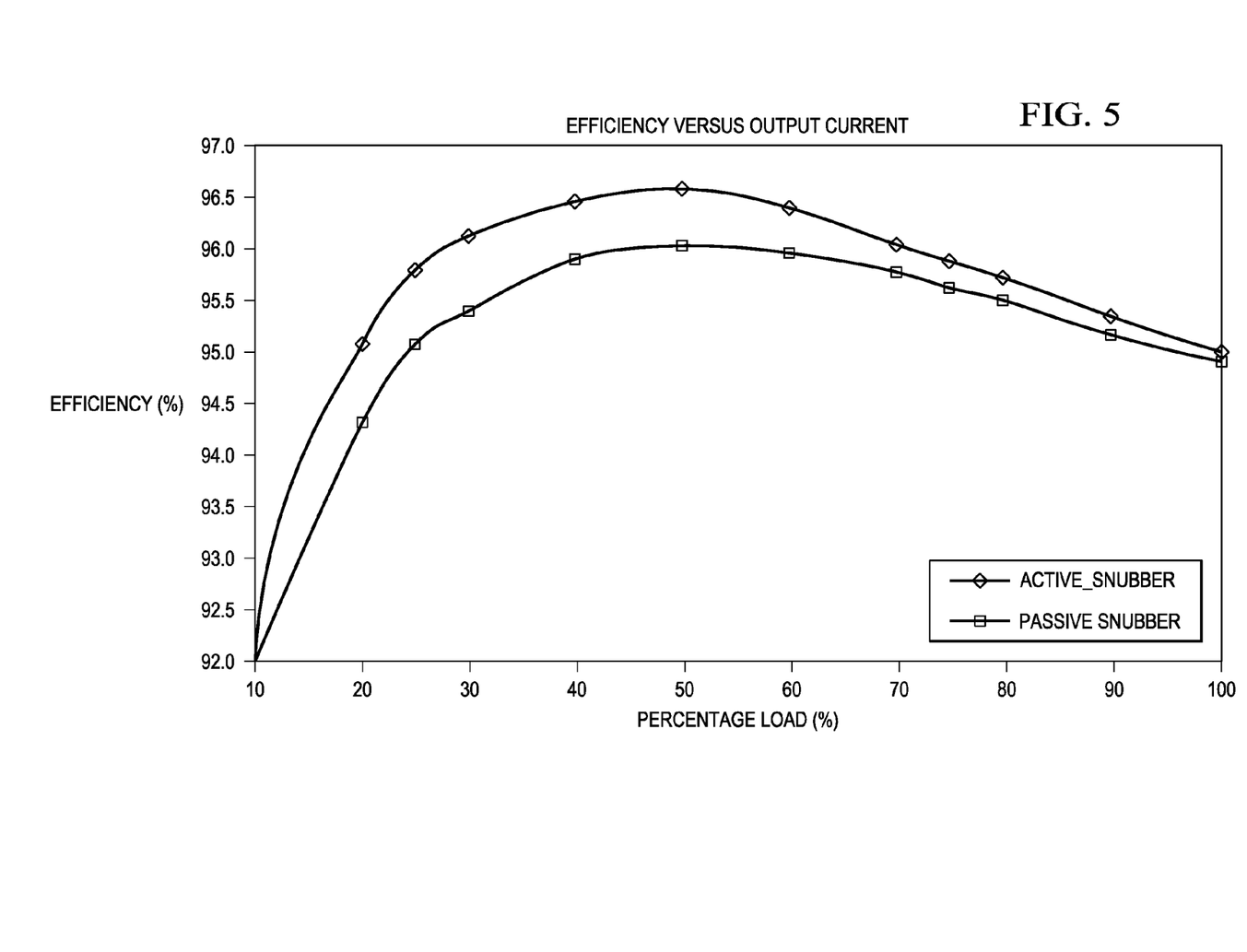
FIG. 5 is a diagram comparing the efficiencies of an example LLC converter without an active snubber circuit and to the same LLC converter with an active snubber circuit.

Turning now to FIG. 5, illustrated is a diagram comparing the efficiencies of an example LLC converter without an active snubber circuit and to the same LLC converter with an active snubber circuit. The lower curve represents converter efficiency with a passive snubber circuit. The upper curve represents converter efficiency with an active snubber circuit constructed according to the principles of the invention. It is apparent that the energy that would have otherwise resulted in ringing at an internal node in the power converter or been dissipated in a passive snubber circuit instead contributes to the overall efficiency of the power converter over a broad range of output current load percentages. Efficiency increases are especially significant (about 0.5%) under moderate (30%-60%) load conditions).

Figure 6:
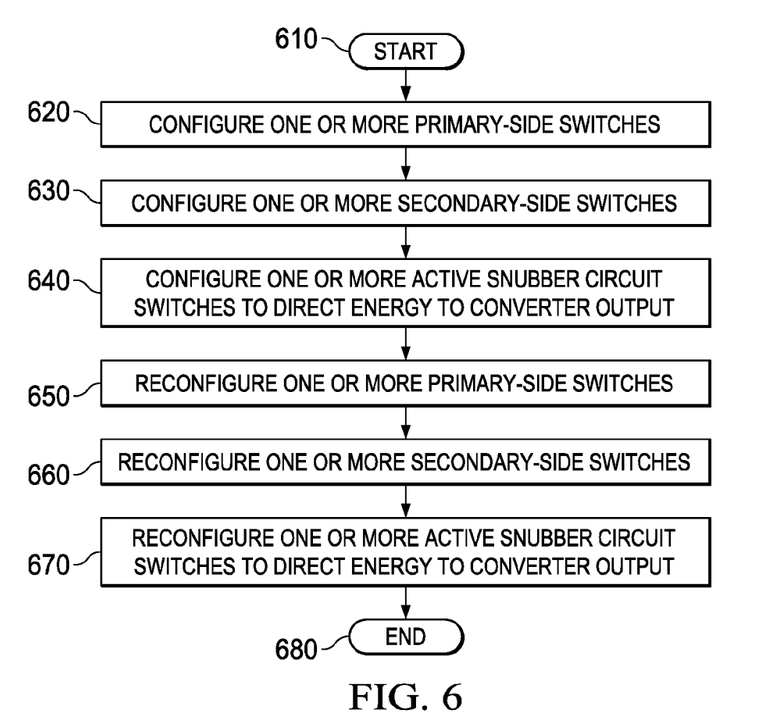
FIG. 6 is a flow diagram of one embodiment of a method of operating an LLC converter carried out according to the principles of the invention.

Turning now to FIG. 6, illustrated is a flow diagram of one embodiment of a method of operating an LLC converter carried out according to the principles of the invention. The method begins in a start step 610. In a step 620, one or more primary-side switches are configured (opened or closed as needed to initiate a particular portion of an operating cycle). In a step 630, one or more secondary-side switches are likewise configured. In a step 640, one or more active snubber circuit switches are configured. As a result thereof, energy that would have otherwise resulted in a ringing waveform or been dissipated in a passive snubber circuit is directed instead to the output of the power converter. In a step 650, one or more primary-side switches are reconfigured (opened or closed as needed to initiate another particular portion of the operating cycle). In a step 660, one or more secondary-side switches are likewise reconfigured. In a step 670, one or more active snubber circuit switches are reconfigured. As a result thereof, additional energy that would have otherwise resulted in a ringing waveform or been dissipated in a passive snubber circuit is directed instead to the output of the power converter. The method ends in an end step 680.

Those skilled in the art to which this application relates will appreciate that other and further additions, deletions, substitutions and modifications may be made to the described embodiments.

What is claimed is:

1. An active multi-snubber circuit for a power converter, comprising:
    an active snubber circuit coupled to a secondary-side of a transformer in said power converter and windings of the secondary-side coupled to an output of the power converter;
    an active snubber circuit switch coupled in parallel with the active snubber circuit and configured to receive a control signal;
    a second active snubber circuit also coupled to the secondary-side of the transformer;
    a second active snubber circuit switch coupled in parallel with the second active snubber circuit and configured to receive a second control signal; and
    wherein said power converter is an LLC converter.

2. The circuit as recited in claim 1 wherein said power converter further comprises a leading-edge delay circuit coupled to said active snubber circuit switch, said control signal being derived from a primary control signal provided to a primary-side switch.

3. The circuit as recited in claim 1 wherein said active snubber circuit is coupled to a first secondary winding of the transformer and the second active snubber circuit is coupled to a second secondary winding of the transformer.

4. The circuit as recited in claim 1, wherein each of the active snubber circuits comprises a diode, and the diode is in parallel with a secondary-side switch; and wherein the active snubber circuit further comprising a first resistor coupled between said active snubber circuit switch and the diode.

5. The circuit as recited in claim 1 further comprising a second resistor coupled between said active snubber circuit switch and ground.

6. A method of operating an isolated LLC converter, the method comprising:
    operating one or more primary-side switches to provide energy to a secondary side of the converter;
    switching, with a first control signal, a first secondary-side switch that is in parallel with a first active snubber;
    switching, with a second control signal, a second secondary-side switch that is in parallel with a second active snubber; and
    switching the first active snubber and the second active snubber to increase the energy to be directed to an output of said isolated LLC converter, wherein the energy is more than from switching only one of the first or second active snubbers.

7. The method as recited in claim 6 further comprising switching the first active snubber through a first secondary winding of a transformer on the secondary side of the isolated LLC converter and switching the second active snubber through a second secondary winding of the transformer.

8. The method as recited in claim 6 further switching one or more active snubber switches, each of which controls one of the active snubber circuits, wherein said switching said one or more active snubber switches comprises receiving a control signal that closes said one or more active snubber circuit switches during at least portions of times during which corresponding ones of said secondary-side switches are open.

9. The method as recited in claim 6 further comprising inverting the first control signal relative to the second control signal to provide a control signal for one of said one or more active snubber circuit switches.

10. The method as recited in claim 6 further comprising delaying a leading edge of the first and second control signal to switch one of said active snubber circuits.

11. The method as recited in claim 6 further comprising operating said isolated LLC converter in a variable frequency mode of operation.

12. The method as recited in claim 6 further comprising operating said isolated LLC converter in a pulse-width modulated mode of operation.

13. An LLC converter, comprising:
    an isolation transformer having a primary winding and first and second secondary windings;
    a resonant inductor and resonant capacitor coupled in series with said primary winding, said primary winding being further coupled to a negative rail of an input of said converter;
    a first primary-side switch coupled between said resonant inductor and a positive rail of said input;
    first and second secondary-side switches coupled to an output capacitor via first and second secondary windings, an output of said converter derived from across said output capacitor; and
    an active snubber circuit associated with each of said first and second secondary-side switches, each of said active snubber circuits including:
        a series-coupled first capacitor and diode associated with a corresponding one of said first and second secondary-side switches and coupled to said output, and an active snubber circuit switch coupled in parallel with said diode and configured to receive a control signal that closes said active snubber circuit switch during at least a portion of a time during which said corresponding one of said first and second secondary-side switches is open.

14. The converter as recited in claim 13 wherein said converter is an LLC converter further comprising an inverter coupled to said active snubber circuit switch, said control signal being an inverted form of a control signal provided to said secondary-side switch.

15. The converter as recited in claim 13 further comprising a leading-edge delay circuit coupled to said active snubber circuit switch, said control signal being derived from a control signal provided to a primary-side switch.

16. The converter as recited in claim 15 wherein said power converter is an LLC converter.

17. The converter as recited in claim 13 wherein said active snubber circuit further includes a second capacitor coupled in parallel with said diode.

18. The converter as recited in claim 13 wherein said active snubber circuit further includes a first resistor coupled between said active snubber circuit switch and said diode, and a second resistor coupled between said active snubber circuit switch and said output.

19. The circuit as recited in claim 1, further comprising a first secondary-side switch in parallel with the active snubber circuit; and a second secondary-side switch in parallel with the second active snubber circuit.

20. The circuit as recited in claim 1, wherein a control of the LLC converter comprises variable frequency mode.

* * * * *

UNITED STATES PATENT AND TRADEMARK OFFICE
CERTIFICATE OF CORRECTION

PATENT NO. : 8,547,711 B2  
APPLICATION NO. : 12/950545  
DATED : October 1, 2013  
INVENTOR(S) : Reddy

Page 1 of 1

It is certified that error appears in the above-identified patent and that said Letters Patent is hereby corrected as shown below:

In the Claims

In Column 8, Line 64, in Claim 18, delete "includes a" and insert -- includes: a --, therefor.

Signed and Sealed this
Thirty-first Day of December, 2013

Margaret A. Focarino
*Commissioner for Patents of the United States Patent and Trademark Office*